Feb. 13, 1940.   J. R. SKOVERSKI   2,189,841
JOINT FOR FISHING TACKLE
Filed May 12, 1937

INVENTOR
JOHN R. SKOVERSKI
BY
HIS ATTORNEY

Patented Feb. 13, 1940

2,189,841

UNITED STATES PATENT OFFICE 2,189,841

JOINT FOR FISHING TACKLE

John R. Skoverski, Oakland, Calif., assignor to Joseph Schor, San Francisco, Calif.

Application May 12, 1937, Serial No. 142,153

2 Claims. (Cl. 43—28)

My invention relates to connecting means for fastening a gut to another element, such as the shank of a hook.

It is among the objects of my invention to provide improved means for fastening a gut to another element, whereby greater security is insured between the fastened parts.

Another object of the invention is to provide a joint of the character described which affords a smooth, unobvious connection between the parts, without the bulkiness and detractive characteristics of a knotted connection.

Still another object of my invention is to provide a joint which prevents wearing of gut against metal at the connection; which wearing is the usual cause of weakness in joints of this type.

The invention possesses other objects and features of advantage, some of which, with the foregoing, will be set forth in the following description of my invention. It is to be understood that I do not limit myself to this disclosure of species of my invention as I may adopt variant embodiments thereof within the scope of the claims.

Referring to the drawing.

Figure 1:
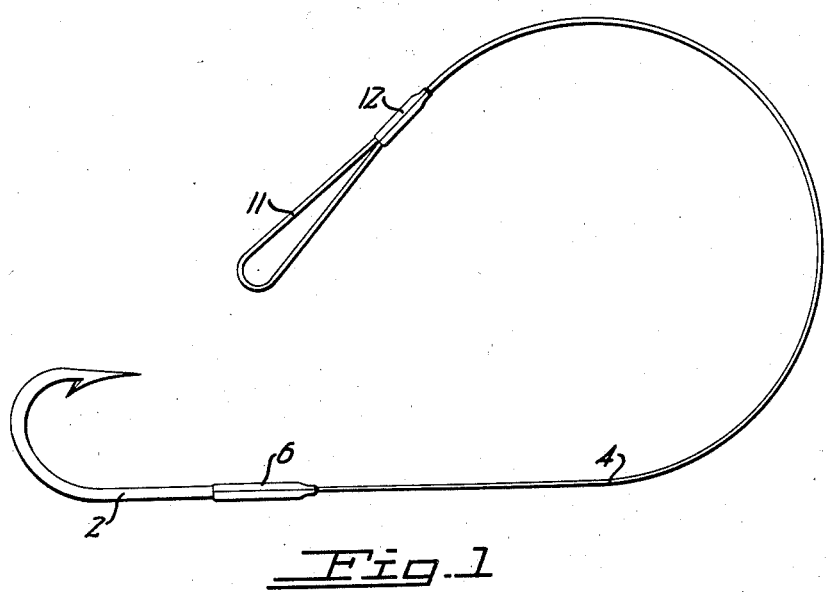
Figure 1 is a side view of a snelled hook embodying the improvements of my invention.

In forming a connection between a gut and another element, such as the shank of a hook, there are several important considerations affecting the utility and appearance of the joint. In the first place, a secure connection between the parts is paramount. This has led to the common practice of knotting the gut. Such knots require an eye in the hook and inherently result in bulky connections. Hooks have also been made by overlapping the gut with a straight shanked hook, and fastening the two together with a sleeve; but the extra thickness caused by the gut lying alongside the shank, together with the added thickness of the encircling sleeve, produces a very bulky construction. Also, the arrangement of the gut alongside the shank causes the gut to pull at an angle, instead of directly in the line of the shank axis. This leads to a second important consideration; namely, that of providing a connection without knots and without adding materially to the thickness of the shank; the ideal connection being one which keeps the gut in line with the shank, and which gives the effect of a shank gradually tapering into the gut to preserve the continuity of the strand.

Another difficulty experienced with joints where guts are lapped with a shank is that the point where the gut leaves the end of the shank becomes worn and frayed by the gut rubbing against the metal. This leads to a third important consideration in snelled hook construction; namely, that of providing a joint in which the gut is held firmly by means extending beyond the end of the shank.

My improved joint fulfills all of these conditions; and in terms of broad inclusion, comprises an element, such as a hook shank, to which a gut is to be fastened, and a gut arranged with an end overlapping the element. A sleeve is provided to surround the overlapped parts, and has a portion projecting beyond the end of the element for embracing the gut where it leaves the joint. This projecting portion is preferably reduced to provide a snug fit with the gut, and is axially aligned with the joint so that the gut is positioned to pull directly in line with the joint. This sleeve fastening means is applicable either where a gut is fastened to a metallic element such as a hook shank, or to a flexible element such as another piece of gut. In the case of fastening a gut to a hook shank, the end of the latter is preferably flattened, so that the thickness of the overlapped parts is not substantially greater than the diameter of the shank. The flattened surface is also preferably roughened, as by providing teeth, to insure a positive connection.

In greater detail, and referring to the drawings, a snelled hook embodying the improvements of my invention comprises a shank 2 having a flattened area 3 sloping toward the end of the shank. A gut or snell 4 is positioned in line with the axis of the shank, and with an end lapping the flattened area 3.

The parts are fastened together by a sleeve of metal, such as stainless steel or German silver, comprising a body portion 6 clamped around the shank, and a reduced neck portion 7 extending beyond the end of the shank and embracing the gut. Body portion 6 of the sleeve preferably extends back over a considerable part of the shank, say ⅝ inch for a No. 4 hook, to give clamping surface; while the neck portion 7 is relatively shorter, say about ⅛ inch for the above size hook. The sleeve is preferably made from a strip of metal and is preferably formed with a die so that the reduced neck is smoothly formed. When the sleeve is clamped in final position about the parts, the edges of the strip abut together to form a continuous, smooth surface; the ends of the metal being preferably rounded to add to the smoothness of the joint. Thus, in the final joint, the body portion 12 of the sleeve is clamped about the shank 2, and the neck portion 7 fits snugly around the projecting strand 4 of the gut.

Figure 2:
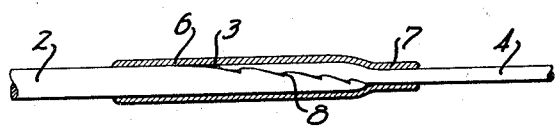
Figure 2 is an enlarged sectional view of the sleeved connection between the hook shank and gut.

In order to insure a secure connection between the gut and shank, the flattened surface 3 is preferably roughened to engage the gut. For this purpose a series of ridges or teeth 8 are preferably cut transversely across the flattened area, and these teeth are preferably sloped away from the direction in which the gut is pulling. When the gut is pressed down into the flattened area by the sleeve, the gut is forced against the teeth; and the gut being somewhat deformable is shaped complementary to the ribbed surface. Figure 2 shows how the gut shapes itself to the tapered end of the shank; the end of the gut being somewhat flattened, and pressed into the spaces between the teeth. This produces a connection which is exceedingly strong, and will cause the main strand of the gut to break before the joint gives way. I have broken 75 lb. test guts without causing the gut to pull out of my improved socket connection.

It will be observed that the thickness of the overlapped parts in the final joint is no greater than the shank thickness; and the sleeve, being of comparatively thin metal, does not add much to the shank diameter. As a result, the connection forms a smooth, unobvious joint, without the bulkiness that usually characterizes joints of this kind. It will also be noted that the projecting neck 7 of the sleeve effectively prevents the gut from rubbing and wearing against the end of the hook shank; and also serves to hold the gut so that the pull is directly in the line of the shank axis. This direct pull further increases the strength of the joint, and effectively prevents wearing of the gut at this point.

Figure 3:
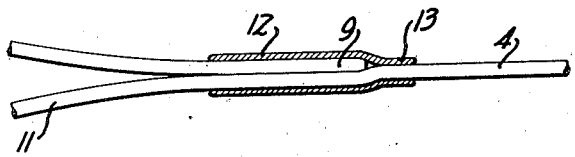
Figure 3 is a similar view of the sleeved connection at the looped end of the gut.

As shown in Figures 1 and 3, the other end 9 of the gut or snell is preferably turned back to form a loop 11; and the overlapping portions of the gut are preferably fastened by a second metallic sleeve having a body portion 12 clamped around the double thickness of gut, and also having a reduced neck portion 13 embracing the projecting strand 4 of the gut. This neck portion of the sleeve again serves to hold the strand 4 so that the pull of the loop is directly in the line of axis of the main strand.

In this case the free end 9 of the loop comprises the element to which the main strand 4 of the gut is fastened. If desired the sleeve may be employed for fastening together two separate pieces of gut; in which case the body of the sleeve encircles the overlapped gut portions. In such a connection, a reduced neck is preferably provided at each end for embracing the oppositely projecting strands.

Figure 4:
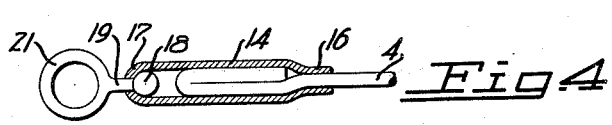
Figure 4 shows a swivel at the end of the gut.

Figure 4 shows the free end of the gut folded back to overlap the main strand within a sleeve 14; the latter having a neck portion 16 as in the other joint connections. In this case the outer end 17 of the sleeve is partially closed to provide a socket for the enlarged end 18 of a shank 19 of an eye 21. This provides a swivel connection at the outer end of the gut, to which a leader or line may be fastened.

I claim:
1. A fish hook comprising a shank having a flattened area at the end thereof, a leader having an end overlapping the flattened area of the shank, and a sleeve encircling the overlapped parts to press the leader against said flattened surface, whereby the thickness of said overlapping parts is not substantially greater than the diameter of the shank.

2. A fish hook comprising a shank having a flattened area at the end thereof, a leader having an end overlapping the flattened area of the shank, said flattened area having a roughened surface for engaging the leader, and a sleeve encircling the overlapped parts to press the leader against said flattened surface, whereby the thickness of said overlapping parts is not substantially greater than the diameter of the shank.

JOHN R. SKOVERSKI.